3,476,500
CONCENTRATED COLORANTS
Alvin C. Litke, West Seneca, N.Y., assignor to Allied Chemical Corporation, New York, N.Y., a corporation of New York
No Drawing. Filed Aug. 9, 1965, Ser. No. 478,465
Int. Cl. C09b 67/00; D06p 1/68
U.S. Cl. 8—93                                    12 Claims

ABSTRACT OF THE DISCLOSURE

Production of novel liquid colorant compositions which are stable mobile liquids, useful for coloring petroleum products, by mixing a dye of the solvent type with a liquid alkyl hydroxyaryl compound having at least one alkyl group of at least 8 carbon atoms as a nuclear substituent, and heating the mixture to a temperature above the melting point but below the decomposition temperature of said dye for a sufficient period of time to form said stable homogeneous composition.

---

This invention relates to colorant compositions containing high concentrations of colorants and to processes for making them. It relates more particularly to compositions, and processes for making them, especially in the fluid form, which contain high concentrations of so-called "solvent dyes," more particularly of the oil-soluble class and especially of the hydrocarbon-soluble class, which are soluble in liquid petroleum products, and particularly fuels (including gasolines, kerosenes, diesel fuels and fuel oils) and lubricating oils.

The class of "solvent dyes" forms one of the known groups of organic colorants. They have a combination of properties which render them particularly useful for the coloring of organic liquids employed commercially as solvents, or related materials. The section of Colour Index, second edition, volume 2, at pages 2815–1904 relates to dyes of this class. As stated in the first paragraph of page 2815, the characteristic physical property of the solvent dyes is their solubility in an organic solvent (or solvents). Lubs "The Chemistry of Synthetic Dyes and Pigments" (1955) page 174 divides said dyes into oil-soluble, spirit-soluble and water-soluble classes.

An important commercial use for the solvent dyes is in the coloring of nonpolar solvents such as liquid petroleum products and other hydrocarbon liquids. Thus lead-containing gasoline is required by law to be colored; and gasoline manufacturers color their products distinguishing colors as a means of identification.

For the most part, the solvent dyes do not form concentrated solutions in the common solvents. This is especially true of the oil-soluble dyes, particularly in the case of solvents of the hydrocarbon class and especially liquid petroleum products, such as fuels and lubricating oils, so that preparation of the colored solvent products entails difficulty and undesired expense.

Various methods of introducing dyes into petroleum products have been devised, but none is completely satisfactory and many common oil-soluble dyes have been restricted in their application for coloring gasoline and other fuels because of their low solubility and the absence of suitable methods for introducing the dyes into the liquids to be colored.

Thus, in the dye pot method, the dye is added to a small vessel containing uncolored gasoline and circulated to form a concentrated solution or suspension, which is then added to the body of the fuel to be colored. This method is particularly troublesome where some of the dye becomes suspended in a resulting saturated solution of the dye, since the dye tends to cake and form a sludge that settles to the bottom of the fuel tank.

A common method employed for imparting color to products is to prepare a highly concentrated solution (a stock solution) of the dye in a suitable solvent having higher solvent properties than the hydrocarbon fuel or other product (for example, benzene or xylene) and mix it with the main body of the liquid to be colored in proper proportions (for example, by automatic mixing apparatus or in other suitable ways); but the relative insolubility of the solvent dyes having the desired color characteristics, such as color intensity, prevents the preparation of highly concentrated stock solutions. The following table shows the solubility of a number of such dyes in mineral spirits and xylene, in grams per 100 milliliters of solvent at room temperature, according to Colour Index.

TABLE

| | | Solubility | |
|---|---|---|---|
| Dye | C.I. No. | White Spirit (Mineral Spirits) | Xylene |
| C.I. Solvent Red 23 | 26100 | 0.02–1 | 0.25 |
| C.I. Solvent Red 24 | 26105 | 0.03–1 | [1] 0.06–5 |
| C.I. Solvent Yellow 14 | 12055 | 0.4–0.75 | 1.2–5.6 |
| C.I. Solvent Orange 1 | 11920 | [2] | 0.2–0.6 |

[1] Benzene.
[2] Very slightly.

The cost of the solvents used to prepare the stock solutions usually exceeds the cost of the dye, since the highest solubility obtained, even with excellent solvents, does not exceed about 5%. Besides, the relatively large quantities of solvents needed to carry the dye may have an undesired effect upon some of the fundamental characteristics of a motor fuel.

Attempts have been made to provide ways for incorporating larger quantities of the solvent dyes into the organic liquids in which they are to be employed, but they are subject to a number of objections.

One method includes a dry addition system in which the dye is sucked up by a vacuum aspirator into a blending tank containing gasoline to be colored. This method is extremely troublesome, since the dye may have become lumpy or caked on storage. Another is the introduction of a capsule or pellet which is soluble in the hydrocarbon fluid to be colored, and containing the dye in powder form, into the body of the fuel. These solid dye addition methods require rapid agitation of the liquid hydrocarbon from the bottom to the top of the tank to ensure complete and even distribution of the dye in the main body of the liquid. In addition, the dye has to be of a special texture so as not to cake or ball during storage and during the initial release of a large amount of powder into the main body of the liquid to be colored.

Additives such as biphenyl, alkyl substituted biphenyls, halogen substituted biphenyls and crystalline hydroxy benzenes which render pulverizable oil soluble dyes more readily dispersible and more completely soluble in hydrocarbon fuels also have been proposed. While the agency of such additives improves the solubility properties and tinctorial strength of the powdered dye formulations into which they are incorporated, their addition does not eliminate completely the problems and inconveniences which are associated with the handling of a dye in powder form.

Fluidized systems in which the dye is slurried and milled into a paste with a lubricating oil fraction, in the presence or absence of an alkyl benzene additive, also have been proposed. But such pastes are extremely viscous and require heavy duty metering equipment. Moreover, under freezing conditions they crystallize into solid, unworkable masses which cannot be rendered fluid by simple rewarming.

An object of the present invention is to provide concentrated colorant compositions containing higher concentrations of solvent-soluble dyes than are formed by dissolving such dyes in hydrocarbon solvents.

Another object of the present invention is to provide stable concentrated colorant compositions having a high concentration of oil-soluble dye in a form readily adapted for dissolution and distribution through a large volume of hydrocarbon solvents.

An additional object of the present invention is to provide liquid concentrated colorant compositions which do not separate upon standing at normal room temperatures and upon cooling below 0° C., and which can be added to gasoline in storage tanks by conventional liquid metering equipment and will diffuse more rapidly into gasoline than particulate or paste compositions.

Other objects of the invention in part will be obvious and in part will appear hereinafter.

I have discovered that liquid alkyl hydroxyaryl compounds having at least one alkyl radical of at least 8 carbon atoms as a nuclear substituent constitute a class of compounds which is pecularily adapted for the preparation of colorant compositions containing high concentrations of solvent dyes; they are capable of dissolving much larger amounts of dyes of the solvent soluble class than are the solvents heretofore employed. Thus I have discovered that said liquid alkyl hydroxyaryl compounds (that is, those which are liquids at ordinary room temperature), more particularly those which are mono-hydroxy-mononuclear aryl compounds, and especially liquid monoalkyl phenols having 9 to 20 carbon atoms in the alkyl group, can dissolve more than their own weights of solvent dyes so as to form stable homogeneous concentrated colorant compositions.

I have also discovered that concentrated colorant compositions can be obtained by mixing one, or a mixture of two or more, of such dyes in the molten form with one, or a mixture of two or more, of such alkyl hydroxyaryl compounds in proportions ranging from about 20:80 to about 55:45, by weight, and maintaining the mixture at a temperature between the melting point of the dye (or dye mixture) and the decomposition temperature of the dye (or dye mixture) until a stable, homogeneous composition is obtained. Thus, I have discovered that concentrated colorant compositions which, as such or after dilution with suitable organic liquids, form stable concentrated liquid colorants suitable for incorporating in solvents of the hydrocarbon class, and especially liquid petroleum products, can be obtained by heating a solvent-soluble dye, more particularly an oil-soluble dye and especially one of the hydrocarbon soluble class, with a liquid, solvent-soluble alkyl hydroxyaryl compound having at least one alkyl radical of at least 8 carbon atoms as a nuclear substituent, more particularly a liquid, solvent-soluble monohydroxymononuclear aryl compound, and especially one which is a monoalkyl phenol having 9 to 20, more particularly 9 to 12, carbon atoms in the alkyl group, at a temperature somewhat above the melting point of said dye until a homogeneous product is obtained.

The compositions resulting from the heating operations are in general, at ordinary room temperatures, mobile oils to viscous tar-like liquids to hard solids, depending upon the melting points of the dyes and their concentrations in the compositions; lower melting dyes form pourable oils especially when employed in low concentrations; higher melting dyes form highly viscous liquids to hard solids, especially when employed in high concentrations.

The nature of the products resulting from the heating of the solvent dye with the liquid alkylhydroxy aryl compound of the above class is not known with certainty. Without limiting the invention to any particular theory, they appear to be solutions of the dyes in the liquid alkylhydroxy aromatic compounds. They may, however, include eutectic mixtures or complexes. That the liquid colorant concentrates of this invention are not mere physical mixtures of their individual components is evident from the fact that they possess flow and solubility properties which are not characteristic of the individual components of the concentrates and which are not to be expected from an intimate mixture of such components. The action of the alkylhydroxy aryl compounds is not merely that of a diluent, thinner or suspending agent; since compositions of the type formed in accordance with the present invention are not produced by milling together, at ordinary room temperatures, a mixture of an oil-soluble dye and a liquid alkylphenol of the class employed in accordance with the present invention, even with addition of a hydrocarbon solvent such as xylene. Instead, a thick unmanageable paste is obtained. Moreover, a thick unmanageable paste which changes to a crystalline mass on standing is formed when an intimate mixture of an oil-soluble dye, a liquid alkylphenol of the class referred to above and a hydrocarbon solvent such as xylene is heated to a temperature slightly above the melting point of the dye in proportions corresponding to those employed in the practice of the present invention.

In carrying out the preparation of the compositions of the present invention, a solvent dye (or mixture of solvent dyes) in the molten form is mixed with a liquid alkyl hydroxyaryl compound of the class referred to above and the mixture is maintained at a temperature between the melting point of the dye and the decomposition temperature of the dye (or dye mixture) until a stable homogeneous product is obtained.

In the preferred practice of the present invention the dye (or mixture of dyes) is mixed with an alkylphenol of the class referred to above (or mixture of said alkylphenols) and the mixture is heated at a temperature slightly above the melting point of the dye (or dye mixture) until a stable homogeneous composition is formed.

While the temperature at which the process is carried out is not critical and will vary with the solvent dye or mixture of solvent dyes employed, the heating is preferably carried out at a temperature substantially below the decomposition temperature of the dye or dye mixture. Thus a convenient operating temperature, which avoids the likelihood of adversely affecting the dye, is one ranging from just above the melting point of the dye or dye mixture to 10°–20° C. above such melting point, especially when the dye employed is sensitive to high temperatures.

The amounts of dye and alkyl hydroxyaryl compound employed will depend in part upon the concentration of dye desired in the final colorant composition. In general, proportions of dye to alkyl hydroxyaryl compound ranging from about 20:80 to about 55:45, by weight, are employed; although smaller proportions of dye obviously can be used, if desired. For the preparation of concentrated colorants, proportions ranging from 25:75 to 50:50 and especially 35:65 to 45:55, by weight, are employed.

The duration of the heating for the formation of the colorant composition will vary with the nature of the dye and the nature of the alkyl hydroxyaryl compound employed. In general, the mixture is heated for a sufficient period of time to form a composition which is homogeneous and stable. Thus, in preparing the lower concentrations of low melting dyes, the heating is continued until a product is obtained which, on cooling to 25° C. and left standing, does not separate into phases nor crystallize. In the case of higher melting dyes and higher concentrations of dyes, the heating is continued until a homogeneous product is obtained which, on cooling to 25° C., forms a viscous tar-like liquid that does not separate on standing nor crystallize, or forms a hard solid. The formation of a homogeneous composition can be determined readily by diluting the product by heating it with xylene for several hours to insure complete and homogeneous distribution of the product in the xylene, and then cooling to 25° C. If the heating period has been adequate, the resulting xylene solution will be clear to the naked eye (after removal of any slight residue by filtration, if necessary) and will not precipitate nor crystallize on standing at 25° C. If the mixture is not heated for a sufficient period of time, on cooling it will set to a gel which does not form a solution clear to the naked eye when heated with xylene.

The action of the alkyl hydroxaryl compounds employed in accordance with the present invention is surprising and unique, because other hydroxyaryl compounds, including those containing lower alkyl substituents, as well as non-phenolic additives, fail to produce similar compositions when employed in the practice of the process of the present invention. Thus, di-tertiary-butyl phenol, orthophenyl phenol, beta-naphthol, bisphenol, chlorophenols, alkoxy phenols and alkylaminophenols yield thick pastes or crystalline masses under the above conditions; and alkylbenzenes (for example, isopropyl and dodecyl benzenes), naphthalene and substituted naphthalenes, diphenyl methane, alcohols, glycols, aromatic and aliphatic amines, halobenzenes, alkylamino benzenes and alkoxy benzenes are also ineffective.

The compositions or complexes resulting from the heating operations are in general, at ordinary room temperatures, pourable oils to viscous tar-like liquids to hard solids, as disclosed above. For use in coloring organic liquids, those compositions which are viscous liquids to solids can be diluted to mobile liquid colorant concentrates by heating them with organic solvents in which the dye and the alkyl hydroxyaryl compound are soluble. Various solvents which are miscible and compatible with the organic liquid into which the dye is to be introduced can be employed for this purpose, including polar solvents (for example, glycol, diethylene glycol, etc.) and nonpolar solvents. Preferably an aromatic hydrocarbon solvent (such as, benzene, toluene, xylene, or the like) is employed in view of the low cost, availability and solubility characteristics of such solvents and their miscibility with hydrocarbon liquids and especially petroleum hydrocarbon liquids.

The amounts of the organic solvents employed will depend upon such factors as the nature of the solvent, and of the dye and alkyl hydroxyaryl compound, and the concentration of dye desired in the final product. Sufficient amounts of the organic solvents are employed to convert said compositions to thinly fluid solutions which on, cooling to 25° C., form clear (to the eye) solutions which remain homogeneous (the dye does not precipitate or crystallize and they do not separate into phases) on standing at ordinary room temperatures and which can be poured, filtered, metered, pumped, agitated and otherwise handled like any other fluid. For the preparation of liquid concentrates having high concentrations of dye, an amount of organic solvent substantially less than that of the viscous liquid to solid composition is employed. For example, for a solid composition containing about 55 parts of oil soluble dye and about 45 parts of nonyl phenol, about 50 parts of xylene (by weight) are employed to form a mobile liquid concentrate.

Various solvent dyes, particularly oil-soluble dyes and especially those which are of the arylazo-naphthol and aminoanthraquinone classes, can be employed in the production of concentrates in accordance with the present invention.

The following are representative of such dyes:

| C.I.: | Colour Index No. |
|---|---|
| Solvent Red 23 | 26100 |
| Solvent Red 24 | 26105 |
| Solvent Red 26 | 26120 |
| Solvent Red 27 | 26125 |
| Solvent Yellow 2 | 11020 |
| Solvent Yellow 14 | 12055 |
| Solvent Yellow 7 | 11800 |
| Solvent Orange 1 | 11920 |
| Solvent Orange 30 | 20020 |
| Solvent Blue 14 | 61555 |
| 1,4-bis(isobutylamino)anthraquinone | |
| 1-isobutylamino-4-isopropylamino anthraquinone. | |

Other solvent dyes employable herein are the hydrocarbon soluble colorants described and claimed in my copending application Ser. No. 531,355, entitled "Hydrocarbon Soluble Colorants," filed Mar. 3, 1967.

Various alkyl hydroxyaryl compounds which have as a nuclear substituent at least one alkyl radical of at least 8 carbon atoms, preferably at least 9 carbon atoms, and more particularly 9 to 20 carbon atoms, and which are liquids at ordinary room temperatures (20° to 30° C.) can be used in the practice of the present invention. They include hydroxy derivatives of mononuclear aryl hydrocarbons (such as hydroxybenzenes, hydroxytoluenes and hydroxyxylenes) and hydroxy derivatives of polynuclear aryl hydrocarbons (such as naphthol, hydroxy-biphenyl, bisphenol, etc.) The aryl nucleus may be free from further substituents, or it may contain additional substituents which do not react adversely with the solvent dyes at the temperatures employed and which do not interfere with the solubility of the alkyl hydroxyaryl compounds in organic solvents; such as, one or more alkyl groups (for example, methyl, ethyl, propyl, butyl, amyl, hexyl, heptyl, octyl, nonyl, decyl, undecyl, dodecyl, etc.), halogen (such as, chlorine, bromine, or iodine), mercapto and/or nitro groups.

Those which are alkylphenols (that is, nuclear alkyl derivatives of phenol), more particularly those which are monoalkylphenols (for example, octyl phenol, nonyl phenol, decyl phenol, undecyl phenol, dodecyl phenol, tridecyl phenol, tetradecyl phenol, pentadecyl phenol, heptadecyl phenol, octadecyl phenol, docosyl phenol) and mixtures thereof, are preferably employed. Industrial mixtures of monoalkylphenols which can be produced from olefins or petroleum hydrocarbon fractions or hydrogenated vegetable oils, and particularly those whose alkyl substituent contains 9 to 12 carbon atoms, are advantageously used, in view of their ready availability and relatively low cost.

The concentrated colorant compositions of the present invention have a number of advantages over those heretofore employed for incorporating solvent dyes into organic solvents and especially into liquid petroleum products.

Thus they contain concentrations of dyes which are 5 to 50 times higher than the levels of concentrations obtainable by dissolving the dyes in hydrocarbon solvents alone.

The compositions are stable and have long storage lives; they do not separate on standing for at least six months.

Moreover, they remain in mobile liquid form at temperatures normally encountered in commerce, including temperatures below freezing such as about −18° to 0° C.

The compositions retain the high tinctorial strength of the dyes themselves.

The compositions are compatible with petroleum motor fuels and do not adversely affect their operation.

By reason of their fluid properties, they can be added to gasoline storage tanks by conventional liquid metering equipment; they have excellent miscibility with and diffuse rapidly into gasoline. They are superior to particulate and paste dye compositions not only in this respect but also in eliminating dust and other problems and losses arising from the handling of dry dyestuffs and pastes.

The alkyl hydroxyaryl compounds and especially the alkylphenols employed in the practice of the present invention are readily available compounds which are sufficiently low priced to render their use economical.

The following examples describe specific embodiments of the invention and illustrate the best method contemplated for carrying it out; but they are not to be interpreted as limiting the invention to all details thereof, since changes can be made without departing from the scope of the invention. The temperatures are in degrees centigrade and the parts and percentages are by weight.

Example 1

A mixture of 50 parts of nonylphenol and 50 parts of the red dye, 1-(o-ethoxy-phenylazo-xylylazo)-2-naphthol, having the formula:

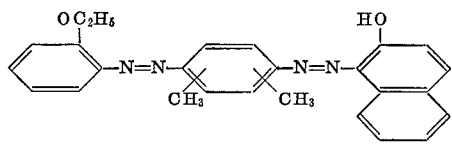

and melting at 80–85° was heated just above its melting point (about 85°) for 16 hours, then allowed to cool to room temperature (about 25°). The resulting clear, red, homogeneous liquid (containing about 50% by weight of the dye) was viscous but sufficiently fluid to be pourable. It was completely miscible with gasoline, which it colored red. It remained fluid and did not separate or crystallize upon standing at room temperature for several months.

Example 2

A mixture of 35 parts of nonylphenol and 40 parts of the dye employed in Example 1 was heated just above its melting point (about 85° C.) for 16 hours, then cooled to 70° C. and diluted with 25 parts of xylene. The product was digested on a steam bath for several hours to insure complete and homogeneous distribution of the resulting product in the xylene. The resulting homogeneous liquid product was treated with 5 parts of filter aid and filtered to yield a clear red concentrate (containing about 40% by weight of the dye) which was completely miscible with gasoline and which remained fluid after standing at room temperature for several months.

Example 3

A mixture of 65 parts of nonyl phenol and 35 parts of the red dye, 1-(xylylazo-xylylazo)-2-naphthol, having the formula

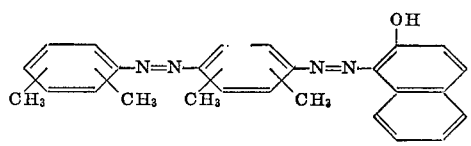

and a melting point of 145–150°, was heated at 155–160° for 16 hours, cooled to 70° and diluted with 20 parts of xylene. The product was digested on a steam bath for several hours to insure complete and homogeneous distribution of the mixture in the xylene. The resulting homogeneous liquid product was treated with 5 parts filter-aid and filtered. A clear red concentrate containing about 30% by weight of dye was obtained which remained fluid after standing at room temperature for several months. It was completely miscible with gasoline.

Example 4

Sixty-five parts of nonyl phenol and 35 parts of a dye known as Gasoline Blue, having the formula

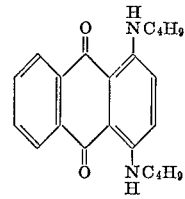

and a melting point of about 80° was heated at slightly above its melting point (80°–90°) for 16 hours, cooled to 70° and diluted with 20 parts of xylene. The product was further treated substantially as set out in Example 3. A clear blue concentrate containing about 30% by weight of dye was obtained which remained fluid and homogeneous after storage at room temperature for several months. It was completely miscible with gasoline.

Example 5

A mixture of 65 parts of nonyl phenol and 35 parts of the orange dye known as C.I. Solvent Yellow 14, having a melting point of 115°–120°, was heated at 130°–135° for 16 hours. On cooling a sample to 25°, it formed a viscous liquid. The mass was cooled to 70°, diluted with 20 parts xylene, and the product was further treated substantially as set out in Example 3. A clear orange concentrate containing about 30% by weight of dye was obtained which remained fluid and homogeneous after storage at room temperature for several months. It was completely miscible with gasoline.

Example 6

A mixture of 65 parts of nonyl phenol and 35 parts of the yellow dye, 2,4-bis(xylylazo)-resorcinol having the formula:

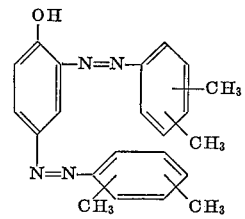

and a melting point of 110°–115°, was heated at 115°–120° for 16 hours, cooled to 70° and diluted with 20 parts xylene. On further treatment as in Example 3, a clear yellow concentrate containing about 30% by weight of dyes, was obtained which remained fluid and homogeneous after storage at room temperature for several months. It was completely miscible with gasoline.

Example 7

Following the procedure of Example 3, a mixture of 65 parts of nonyl phenol, 20 parts of the red dye employed in Example 3, and 15 parts of the orange dye employed in Example 5, after dilution of the resulting homogeneous product with 20 parts of xylene and further treatment as in Example 3, yielded a clear bronze homogeneous solution containing about 30% by weight of dye. The solution was completely miscible with gasoline.

Example 8

Sixty-five parts of dodecyl phenol, 35 parts of the red dye employed in Example 3 were heated as in Example 3 and then treated with 20 parts of xylene essentially according to Example 3. A clear red homogeneous solution containing about 30% by weight of the dye was obtained. It was completely miscible with gasoline in all proportions.

Example 9

The procedure of Example 8 was repeated with 35 parts of the blue dye employed in Example 4. A clear blue homogeneous solution was obtained containing about 30% by weight of the dye and having similar properties.

Example 10

The procedure of Example 5 was repeated with 65 parts of dodecyl phenol, 20 parts of the red dye used in Example 3, 15 parts of the orange dye used in Example 5, and 20 parts of xylene. A clear bronze homogeneous solution containing about 30% by weight of the dye was obtained having similar properties.

Example 11

The procedure of Example 3 was repeated with 30 parts of dodecyl phenol, 35 parts of nonyl phenol, 20 parts of the red dye used in Example 3, 15 parts of the orange dye used in Example 5 and 20 parts of xylene. A clear bronze homogeneous solution containing about 30% by weight of the dyes and having similar properties was obtained.

It will be realized by those skilled in the art that the invention is not limited to the details of the above specific examples and that changes can be made without departing from the scope of the invention.

Thus, other solvent-soluble dyes and mixtures of such dyes, and other alkyl hydroxyaryl compounds of the class set out above and mixtures thereof, can be employed in place of those used in the above examples; and the temperatures and proportions of components employed in preparing the products can be varied, as set out above.

Further, other organic solvents, and particularly other liquid, hydrocarbon-miscible solvents, can be used instead of the xylene employed in the above examples; for example, besides benzene and toluene, other hydrocarbons (such as hexane, heptane, octane, isooctane, and the like), esters (such as methyl acetate, ethyl acetate, methyl propionate, and the like), ethers (such as dimethyl ether, diethyl ether, methyl ethyl ether, and the like) and subsituted benzenes (such as chlorobenzene, dichlorobenzene, bromochlorobenzene, chlorotoluene, chloroxylene, and the like).

I claim:

1. A colorant composition comprising essentially a solvent dye and a liquid alkyl hydroxyaryl compound having at least one alkyl radical of at least 8 carbon atoms as a nuclear substituent, said composition at 25° C. being a stable, mobile liquid to a viscous liquid to a hard solid.

2. A stable, concentrated colorant composition comprising essentially a solvent dye in solution in a liquid alkyl hydroxyaryl compound having at least one alkyl radical of at least 9 carbon atoms as a nuclear substituent, the relative proportions of said dye and said alkyl hydroxyaryl compound ranging from 20:80 to 55:45, by weight, produced by mixing said dye in molten form with said alkyl hydroxyaryl compound and maintaining the mixture at a temperature between the melting point of the dye and the decomposition temperature of the dye for a time sufficient to produce a stable, homogeneous composition.

3. A stable, concentrated colorant composition as claimed in claim 2 wherein the dye is an oil soluble dye and the alkyl hydroxyaryl compound is a monohydroxy-mononuclear aryl compound.

4. A stable, concentrated colorant composition as claimed in claim 3 wherein the alkyl hydroxyaryl compound is a monoalkylphenol having at least 9 carbon atoms in the alkyl radical.

5. A stable, concentrated colorant composition consisting essentially of a solvent dye and a solvent liquid alkyl hydroxyaryl compound having at least one alkyl substituent of at least 8 carbon atoms, the relative proportions of said dye and said alkyl hydroxyaryl compound ranging from 20:80 to 55:45, by weight, said composition at 25° C. being an oil to a viscous liquid to a hard solid.

6. A stable, concentrated colorant composition consisting essentially of an oil-soluble dye in solution in a liquid monoalkyl phenol having 9 to 20 carbon atoms in the alkyl group, the relative proportions of said dye and said monoalkyl phenol ranging from 20:80 to 55:45, by weight, said composition being at 25° C. an oil to viscous liquid to hard solid which, when diluted by heating with xylene, forms a clear mobile solution that remains fluid and homogeneous when left standing at 25° C. said colorant composition produced by mixing said dye in molten form with said alkyl hydroxyaryl compound and maintaining the mixture at a temperature between the melting point of the dye and decomposition temperature of the dye for a time sufficient to produce a stable, homogeneous composition.

7. A composition as claimed in claim 6 wherein the dye is of the hydrocarbon-soluble class, the alkylphenol is hydrocarbon soluble, and the relative proportions of said dye and said alkylphenol range from 25:75 to 45:55, by weight.

8. A composition as claimed in claim 6 wherein the dye is selected from the group consisting of arylazo-naphthols and amino-anthraquinones, and the monoalkyl phenol has 9 to 12 carbon atoms in the alkyl group.

9. A concentrated colorant composition in the form of a mobile liquid comprising essentially a solvent-soluble dye, a alkylphenol having at least one alkyl substituent of at least 8 carbon atoms, the relative proportions of said dye and said alkylphenol ranging from 20:80 to 55:45, by weight, and an organic liquid which is a solvent for said dye and for said alkylphenol, said composition being a clear solution which remains homogeneous when left standing at 25° C.

10. A stable, concentrated colorant composition in the form of a mobile liquid comprising essentially (a) a viscous liquid to hard solid composition as claimed in claim 5 wherein the dye is of the oil-soluble class and the alkyl hydroxyaryl compound is a liquid monoalkyl phenol having 9 to 20 carbon atoms in the alkyl group and the relative proportions of said dye and said monoalkyl phenol range from 25:75 to 55:45, by weight, and (b) an organic liquid diluent which is a solvent for said dye and for said monoalkyl phenol, said colorant composition being a clear solution which remains homogeneous when left standing at 25° C.

11. A stable, concentrated liquid colorant composition as claimed in claim 10 wherein the dye is of the hydrocarbon-soluble class, the alkylphenol is hydrocarbon soluble, and the organic liquid diluent is a hydrocarbon.

12. A stable, concentrated liquid colorant composition as defined in claim 11 wherein the dye is selected from the group consisting of arylazonaphthols and amino-anthraquinones, the alkylphenol has 9 to 12 carbon atoms in the alkyl group, and the organic liquid diluent is an aromatic hydrocarbon.

References Cited

UNITED STATES PATENTS

| | | | |
|---|---|---|---|
| 1,729,938 | 10/1929 | Harris | 8—93 |
| 1,884,431 | 10/1932 | Watson | 44—59 |
| 2,960,381 | 11/1960 | Bashford | 8—93 |
| 3,164,449 | 1/1965 | Buxbaum. | |

NORMAN G. TORCHIN, Primary Examiner

JOHN E. CALLAGHAN, Assistant Examiner

U.S. Cl. X.R.

8—3; 44—59